United States Patent [19]

Tanimoto et al.

[11] 4,086,655

[45] Apr. 25, 1978

[54] COMBINATION TIMEPIECE AND CALCULATOR INCLUDING SLIDABLE KEYBOARD MEANS

[75] Inventors: Akira Tanimoto, Kashihara; Kosuke Nishimura, Nara, both of Japan

[73] Assignee: Sharp Kabushiki Kaisha, Osaka, Japan

[21] Appl. No.: 753,198

[22] Filed: Dec. 22, 1976

[30] Foreign Application Priority Data

Dec. 22, 1975 Japan .................... 50-173814[U]

[51] Int. Cl.² .................... G06F 7/38; G06F 15/02; G04B 37/12
[52] U.S. Cl. .................... 364/705; 58/50 R; 58/152 R; 364/709
[58] Field of Search ............... 235/152, 156; 340/365 R; 58/50 R, 152 R, 88 R, 88 E, 89

[56] References Cited

U.S. PATENT DOCUMENTS

| | | | |
|---|---|---|---|
| 3,813,533 | 5/1974 | Cone et al. | 235/156 |
| 3,816,730 | 6/1974 | Yamamoto et al. | 58/152 R X |
| 3,920,979 | 11/1975 | Kilby et al. | 235/168 |
| 3,928,960 | 12/1975 | Reese | 58/152 R |
| 3,940,758 | 2/1976 | Margolin | 340/365 R X |

*Primary Examiner*—Jerry Smith
*Attorney, Agent, or Firm*—Birch, Stewart, Kolasch & Birch

[57] ABSTRACT

In a combination timepiece and calculator, a keyboard receiving section is provided within the body of the combination timepiece and calculator for accommodating a slidable keyboard therein. Switching means are associated with the keyboard receiving section so as to place the combination timepiece and calculator in the timepiece mode when the keyboard is housed within the keyboard receiving section, and to place the combination timepiece and calculator in the calculator mode when the keyboard is drawn out from the keyboard receiving section.

7 Claims, 18 Drawing Figures

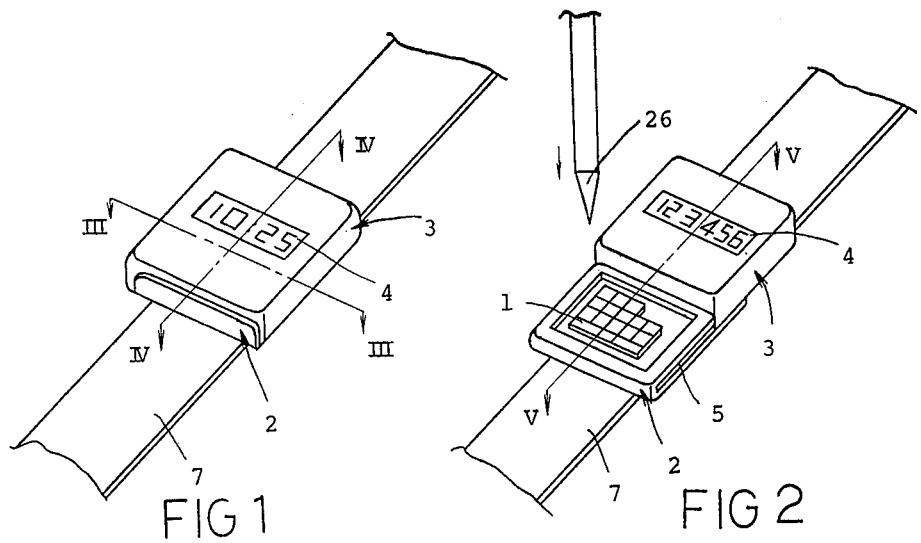
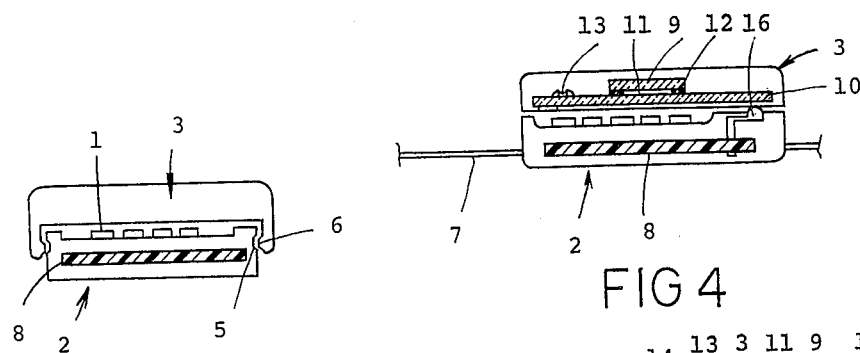
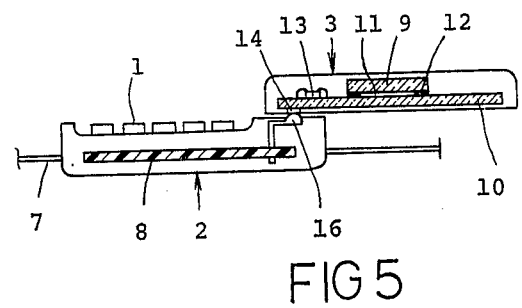
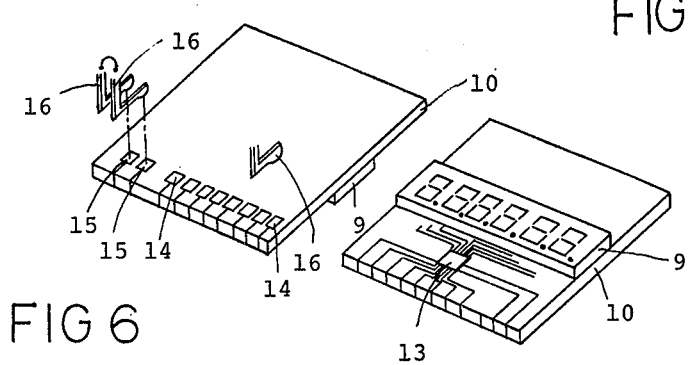

COMBINATION TIMEPIECE AND CALCULATOR INCLUDING SLIDABLE KEYBOARD MEANS

BACKGROUND AND SUMMARY OF THE INVENTION

The present invention relates to a combination timepiece and calculator and, more particularly, to keyboard means slidably secured within the combination timepiece and calculator.

Recently, a combination timepiece and calculator has been developed which functions as an electronic calculator in the calculator mode and as an electronic wristwatch or an electronic clock in the timepiece mode.

In the combination wristwatch and calculator, it is a great problem how to minimize the size of the combination wristwatch and calculator without deteriorating the display quality and without creating difficult handling of the keyboard means. Morever, it is required to protect the keyboard means from the ambience when the combination wristwatch and calculator is worn by the operator in the wristwatch mode.

The combination clock and calculator sometimes functions as interior ornamentation. Therefore, the keyboard means are desired to disappear from the outer appearance when the combination clock and calculator is used as a clock to enhance the ornamentation function.

Accordingly, an object of the present invention is to provide a combination timepiece and calculator which can ensure easy handling of the keyboard means and easy reading of the information displayed on the display means.

Another object of the present invention is to provide a combination wristwatch and calculator of a minimum size.

Still another object of the present invention is to improve the keyboard means included within the combination timepiece and calculator.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a keyboard receiving section is provided within the body of a combination timepiece and calculator for slidably accommodating keyboard means performing the information introduction function in the calculator mode. The keyboard means are housed within the keyboard receiving section when the combination timepiece and calculator functions in the timepiece mode.

Switching means are associated with the keyboard receiving section so as to place the combination timepiece and calculator in the timepiece mode when the keyboard means are housed within the keyboard receiving section, and to place the combination timepiece and calculator in the calculator mode when the keyboard means are drawn out from the keyboard receiving section.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a perspective view of an embodiment of a combination timepiece and calculator of the present invention placed in the timepiece mode;

FIG. 2 is a perspective view of the combination timepiece and calculator of FIG. 1, which is placed in the calculator mode;

FIG. 3 is a sectional view as seen at III—III of FIG. 1;

FIG. 4 is a sectional view as seen at IV—IV of FIG. 1;

FIG. 5 is a sectional view as soon at V-V of FIG. 2;

FIG. 6 is a perspective view showing the rear surface of a glass substrate for supporting a display means contained within the combination timepiece and calculator of FIGS. 1 and 2;

FIG. 7 is a perspective view showing the front surface of the glass substrate of FIG. 6;

DESCRIPTION OF THE PREFERRED EMBODIMENTS

Figure 8:
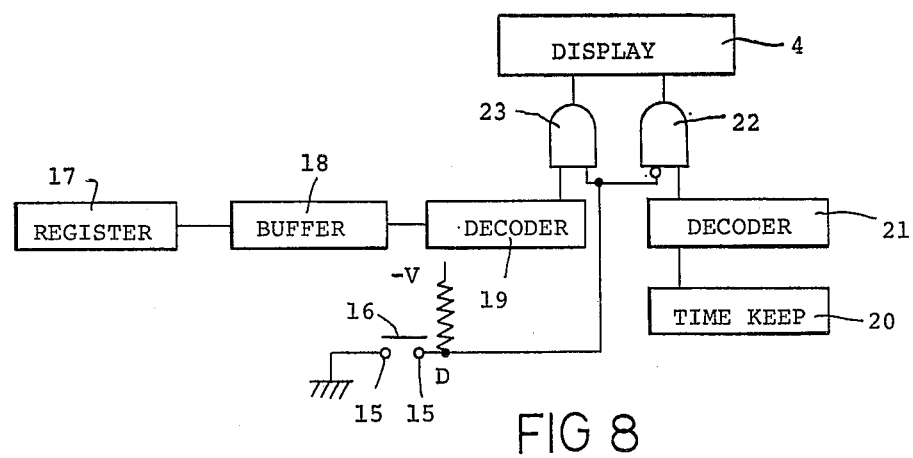
FIG. 8 is a schematic circuit diagram of control means contained within the combination timepiece and calculator of FIGS. 1 and 2.

FIGS. 1 through 5 show an embodiment of a combination wristwatch and calculator of the present invention, wherein FIG. 1 shows the wristwatch mode, FIG. 2 shows the calculator mode, FIGS. 3 and 4 are sectional views as seen at III-III and IV-IV of FIG. 1, respectively, and FIG. 5 is a sectional view as seen at V-V of FIG. 2.

The present combination wristwatch and calculator mainly comprises a first unit 2 including keyboard means 1, and a second unit 3 slidably secured on the first unit 2. The second unit 3 is positioned to cover the first unit 2 as shown in FIG. 1 when the combination wristwatch and calculator is placed in the wristwatch mode. The second unit 3 is slidable to expose the keyboard means 1 as shown in FIG. 2 when the combination wristwatch and calculator is placed in the calculator mode.

The second unit 3 includes display means 4 for displaying current time information, numeral information inputted through the keyboard means 1, and operation results in the calculator mode. The first unit 2 is fixed to a belt 7, thereby allowing the wearing of the combination wristwatch and calculator on the operator's wrist. The first unit 2 includes grooves 5 formed on the opposing side walls thereof, and the second unit 3 includes projections 6 formed on the inner surface of extended side walls thereof. The projections 6 are accommodated within the grooves 5 as shown in FIG. 3, whereby the second unit 3 is slidably secured on the first unit 2.

The first unit 2 further includes a circuit board 8 for supporting a key input circuit associated with the keyboard means 1, and connection terminals 16 electrically connected to the key input circuit supported by the circuit board 8. The second unit 3 further includes glass substrates 9 and 10 for supporting a liquid crystal display unit. Display electrodes (not shown) are formed on the inner surface of the respective glass substrates 9 and 10. Two glass substrates 9 and 10 are spaced from each other via a spacer 12, whereby liquid crystal compositions are filled between the glass substrates 9 and 10 as is well known in the art. The glass substrate 10 has extended portions, which support an LSI 13 including a display driver circuit, an arithmetic operation control circuit, a time information keeping circuit, etc.

FIG. 6 shows the rear surface of the glass substrate 10, and FIG. 7 shows the front surface of the glass substrate 10. Output terminals of the LSI 13 and the display electrodes formed on the glass substrate 10 are electrically communicated to each other via printed wirings. The respective terminals of the LSI 13 are connected to connection terminals 14 and 15 formed on the rear surface of the glass substrate 10 via the side wall of the glass substrate 10. The connection terminals 14 function to develop key strobe signals to the key input circuit, and to introduce key input signals from the key input circuit. The connection terminals 15 are provided for automatically switching between the wristwatch mode and the calculator mode in response to the slide operation of the second unit 3.

When the combination wristwatch and calculator is used as the wristwatch, all the connection terminals 14 and 15 are in the open condition as shown in FIG. 4. The combination wristwatch and calculator is automatically placed in the wristwatch mode, because the connection terminals 15 are in the open condition.

When the combination wristwatch and calculator is desired to function as the calculator, the second unit 3 is slid to expose the keyboard means 1 as shown in FIG. 2. The connection terminals 16 supported by the circuit board 8 become contact with the connection terminals 14 and 15 formed on the rear surface of the glass substrate 10 as shown in FIG. 5. The key strobe signals can be transferred to the key input circuit and the key input signals can be introduced from the key input circuit, since the connection terminals 16 are connected to the connection terminals 14. The two connection terminals 16 to be forced into contact with the connection terminals 15 are electrically shunted to each other as shown in FIG. 6. Therefore, when the connection terminals 16 come into contact with the connection terminals 15, the two terminals 15 are electrically shunted to each other. This forces the combination wristwatch and calculator into the calculator mode.

FIG. 8 schematically shows an example of a circuit for controlling the switching between the wristwatch mode and the calculator mode in response to the closing and opening of the connection terminals 15. The control circuit mainly comprises a shift register 17 for storing the inputted numeral information and the operation results; a buffer register 18 for display purposes; a decoder 19 for supplying the display means 4 with display control signals associated with the calculator function; a time information keeping circuit 20; and a decoder 21 for supplying the display means 4 with display control signals associated with the wristwatch mode.

When the connection terminals 15 are in the open condition, node D bears the potential $-V$ (logical value "0"). Therefore, an AND gate 22 is conductive so as to pass the time information display signals from the decoder 21 to the display means 4 therethrough, thereby displaying the horological information on the display means 4. Contrarily, when the connection terminals 15 are connected to each other through the connection terminals 16, the node D bears the potential zero (logical value "1"). Hence, another AND gate 23 is conductive, whereby the numeral information is supplied from the decoder 19 to the display means 4 in order to display the inputted numeral information and the operation results in the calculator mode.

Figure 9:
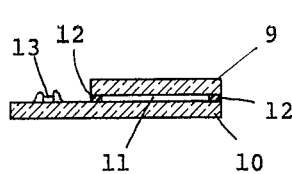
FIG. 9 is a sectional view of another embodiment of the display means for use in the combination timepiece and calculator of FIGS. 1 and 2.

The second unit 3 does not include the keyboard means 1 and, therefore, the display means 4 can be fabricated at a desired size. FIG. 9 shows an example, wherein the display means are enlarged to facilitate the reading of information displayed on the display means 4.

To reduce the power dissipation in the wristwatch mode, although it is not shown in the drawings, a light-receiving element can be fixed on the upper surface of the second unit 3 so as to preclude the application of the driving signals to the display means 4 when the atmosphere becomes dark. This is very effective because the operator can not recognize the display indicated by the liquid crystal display unit when the ambience becomes dark, even though the liquid crystal display unit is activated by the driving signals.

Figure 10:
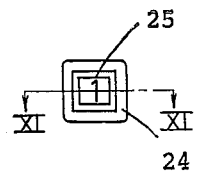
FIG. 10 is a plan view of an embodiment of a key top employed within the combination timepiece and calculator of FIGS. 1 and 2.
Figure 11:
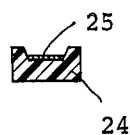
FIG. 11 is a sectional view as seen at XI—XI of FIG. 10.

FIGS. 10 and 11 show an example of a key top structure employed within the keyboard means 1. The upper surface of a key top resin 24 is indented, where a metal plate 25 labelled by a predetermined symbol is installed. The operator can use a pencil or a pen 26 to depress a desired key top, as shown in FIG. 2, without damaging the key top.

Figure 12:
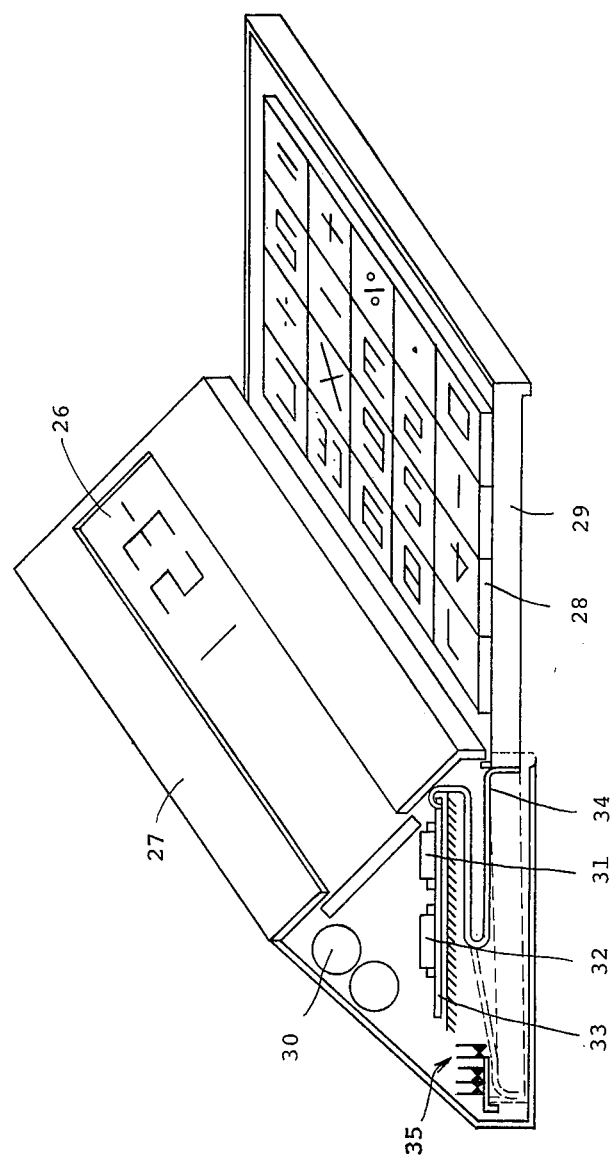
FIG. 12 is a partially sectional, perspective view of another embodiment of a combination timepiece and calculator of the present invention.

FIG. 12 shows an embodiment of a combination clock and calculator of the present invention. A combination clock and calculator body 27 includes a display means 26, and a keyboard means receiving section for slidably securing a unit 29 supporting a keyboard means 28. When the unit 29 supporting the keyboard means 28 is housed within the keyboard means receiving section, the combination clock and calculator is placed in the clock mode. Contrarily, the combination clock and calculator is placed in the calculator mode when the unit 29 is drawn out to expose the keyboard means 28.

The combination clock and calculator body 27 further includes cells 30 for power supply; an LSI 31 including a horological information keeping circuit and a display driver; another LSI 32 including an arithmetic operation circuit and a display driver; a printed circuit board 33 for supporting the LSIs 31 and 32; and wires 34 for electrically connecting respective terminals of the LSIs 31 and 32 to the keyboard means 28. The wires 34 facilitate the electrical connection between the combination clock and calculator body 27 and the slidable unit 29 including the keyboard means 28.

A switching means 35 is provided for automatically switching between the clock mode and the calculator mode in response to the slide operation of the unit 29 supporting the keyboard means 28.

Figures 14, 15:
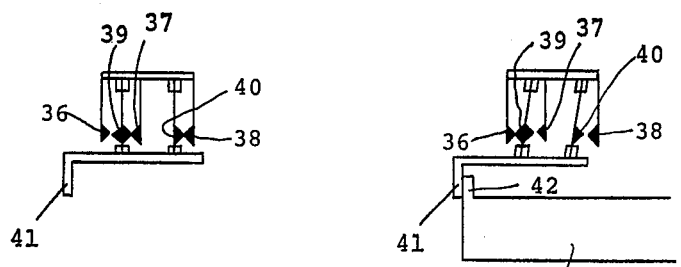
FIG. 14 is a front view of switching means contained within the combination timepiece and calculator of FIG. 12, which is placed in the calculator mode.
FIG. 15 is a front view of the switching means of FIG. 14 placed in the timepiece mode.

FIGS. 14 and 15 show the construction of the switching means 35, wherein FIG. 14 shows the condition when the combination clock and calculator is placed in the calculator mode, and FIG. 15 shows the condition when the combination clock and calculator is placed in the clock mode. The switching means 35 comprises stationary contacts 36, 37 and 38, and movable contacts 39 and 40 which are shifted their location in response to the movement of an angle 41.

Figure 13:
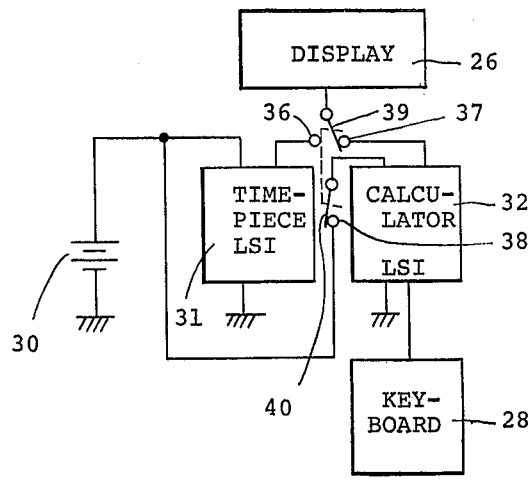
FIG. 13 is a block diagram of control means contained within the combination timepiece and calculator of FIG. 12.

FIG. 13 shows an example of a control circuit associated with the switching means 35. When the unit 29 supporting the keyboard means 28 is drawn out, the movable contacts 39 and 40 become contact with the stationary contacts 37 and 38, respectively, as shown in FIG. 14. Therefore, it will be clear from FIG. 13, the calculator LSI 32 is activated by the cell 30, and the display means 26 is connected to receive its drive signal from the calculator LSI 32. That is, the combination clock and calculator is placed in the calculator mode, whereby the display means 26 displays the inputted numeral information and the operation results.

Contrarily, when the unit 29 supporting the keyboard means 28 is housed in the keyboard means receiving section, the angle 41 is depressed by a projection 42 formed at the end of the unit 29 as shown in FIG. 15. The movable contacts 39 and 40 are released from the stationary contacts 37 and 38, respectively, and the movable contact 39 is forced into contact with the stationary contact 36. Therefore, the display means 26 is connected to receive its drive signal from the timepiece LSI 31 so as to display the horological information. The timepiece LSI 31 is activated by the cell 30 without regard to the fact whether the combination clock and calculator is placed in the clock mode or in the calculator mode.

Figure 16:
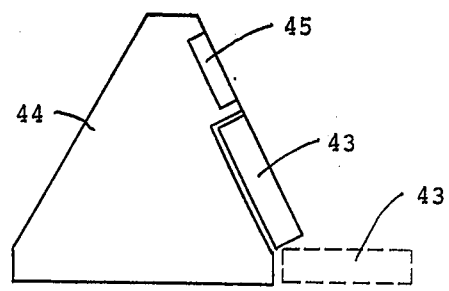
FIG. 16 is a sectional view of still another embodiment of a combination timepiece and calculator of the present invention.

FIG. 16 shows another embodiment of a combination clock and calculator of the present invention. A unit 43 including a keyboard means is rotatably secured on the front wall of the body 44 of the combination clock and calculator. A display means 45 is provided on the front wall of the body 44 at the upper position of the unit 43.

Figures 17, 18:
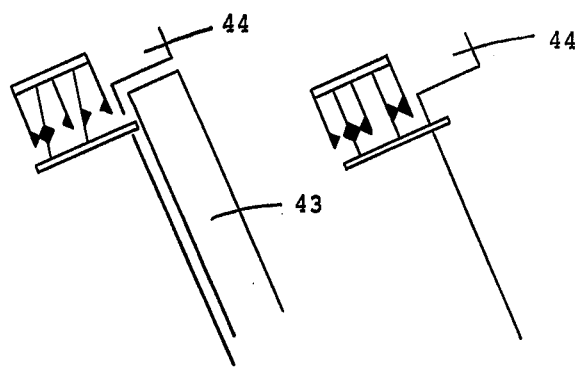
FIG. 17 is a front view of switching means contained within the combination timepiece and calculator of FIG. 16, which is placed in the timepiece mode.
FIG. 18 is a front view of the switching means of FIG. 17 placed in the calculator mode.

When the unit 43 is rotated to be accommodated by the body 44, a switching means, which is the same construction as the switching means 35, is placed in the condition shown in FIG. 17, whereby the combination clock and calculator is placed in the clock mode. Contrarily, when the unit 43 is rotated to expose the keyboard means, the switching means is placed in the condition shown in FIG. 18, whereby the combination clock and calculator is placed in the calculator mode.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a combined calculator and timepiece having a main housing, a digital display module in said housing, a timekeeping circuit for driving said display means in a timekeeping mode and a calculator circuit for driving said display means in a calculating mode, the improvement comprising:
   a keyboard receiving section in said housing;
   a keyboard means mounted in said receiving section for relative movement with said housing between a fully exposed position out of said receiving section and a concealed position in said receiving section; and
   mode selector means responsive to the position of said keyboard means to place said combined calculator and timepiece in said timekeeping and calculating modes in said concealed and exposed positions, respectively.

2. The combination timepiece and calculator of claim 1, wherein said mode selector means comprises:
   detection means for detecting the movement of the keyboard means;
   first control means responsive to said detection means for placing the combination timepiece and calculator in said timekeeping mode when the detection means detect that the keyboard means is concealed in the keyboard receiving section; and
   second control means responsive to said detection means for placing the combination timepiece and calculator in the calculating mode when the detection means detect that the keyboard means is out of the keyboard receiving section.

3. The combination timepiece and calculator of claim 2, wherein the keyboard means is slidable with respect to the main housing of the combination timepiece and calculator, and the keyboard means is drawn out to expose the keyboard means in the calculating mode.

4. The combination timepiece and calculator of claim 1, wherein the digital display module in said main housing comprises a liquid crystal display unit including two glass substrates for sandwiching liquid crystal compositions therebetween, and wherein the timekeeping and calculator circuits are mounted on an extended portion of one of said glass substrates.

5. The invention of claim 4, wherein the keyboard means is fixed to a wrist strap, thereby allowing the wearing of the combination timepiece and calculator on the operator's wrist as a wristwatch.

6. The combination timepiece and calculator of claim 1, wherein the keyboard means is fixed to a wrist strap, thereby allowing the wearing of the combination timepiece and calculator on the operator's wrist as a wristwatch.

7. The invention defined in claim 6 wherein said keyboard means is slidably mounted in said main housing and said main housing is displaced to expose said keyboard means.

* * * * *